United States Patent
Park et al.

(10) Patent No.: US 9,626,267 B2
(45) Date of Patent: Apr. 18, 2017

(54) TEST GENERATION USING EXPECTED MODE OF THE TARGET HARDWARE DEVICE

(71) Applicants: SAMSUNG LTD., Hwaseong-si (KR); INTERNATIONAL BUSINESS MACHINES CORPORATION, Armonk, NY (US)

(72) Inventors: Sung-Boem Park, Hwaseong-si (KR); Amir Nahir, Megadim (IL); Vitali Sokhin, Haifa (IL); Wisam Kadry, Haifa (IL); Jin Sung Park, Hwaseong-si (KR); Ara Cho, Hwaseong-si (KR)

(73) Assignee: International Business Machines Corporation, Armonk, NY (US)

( * ) Notice: Subject to any disclaimer, the term of this patent is extended or adjusted under 35 U.S.C. 154(b) by 78 days.

(21) Appl. No.: 14/610,297

(22) Filed: Jan. 30, 2015

(65) Prior Publication Data
US 2016/0224448 A1 Aug. 4, 2016

(51) Int. Cl.
*G06F 11/00* (2006.01)
*G06F 11/263* (2006.01)

(52) U.S. Cl.
CPC .................. *G06F 11/263* (2013.01)

(58) Field of Classification Search
CPC .............................. G06F 11/263; G06F 11/273
See application file for complete search history.

(56) References Cited

U.S. PATENT DOCUMENTS

| | | | |
|---|---|---|---|
| 6,112,312 A * | 8/2000 | Parker | G06F 11/263 700/79 |
| 6,279,126 B1 * | 8/2001 | Malik | G06F 9/30043 712/43 |

(Continued)

FOREIGN PATENT DOCUMENTS

WO 2010119356 A1 10/2010

OTHER PUBLICATIONS

Demner-Fushman et al., "Automatically Finding Images for Clinical Decision Support", Data Mining Workshops, 2007, Seventh IEEE International Conference on, Oct. 2007. (6 pages).

(Continued)

*Primary Examiner* — Joshua P Lottich
(74) *Attorney, Agent, or Firm* — Ziv Glazberg (57) ABSTRACT

A method, apparatus and product for test generation. The method comprises generating a first set of instructions for a hardware component, that are to be executed when operating in a first mode of operation; in response to a parsed template statement being a marker statement, generating an intermediary set of one or more instructions to cause the hardware component to change the mode of operation to a second mode in accordance with the marker instruction, and modifying the expected mode of the hardware component to a second mode; and generating a second set of instructions for the hardware component, that are to be executed when operating in the second mode of operation. The generation of instructions comprises determining the expected mode and generating instructions in accordance with the expected mode of the hardware component. The generation is performed without having an expected full state of the hardware component.

20 Claims, 2 Drawing Sheets

(56) References Cited

U.S. PATENT DOCUMENTS

| | | | | |
|---|---|---|---|---|
| 6,321,329 | B1 * | 11/2001 | Jaggar | G06F 11/3632 712/227 |
| 6,343,358 | B1 * | 1/2002 | Jaggar | G01R 31/31855 712/227 |
| 6,446,221 | B1 * | 9/2002 | Jaggar | G06F 11/3648 714/30 |
| 7,640,051 | B2 | 12/2009 | Krishnan | |
| 7,672,491 | B2 | 3/2010 | Krishnan | |
| 8,762,608 | B1 * | 6/2014 | Longstreet | G06F 11/273 710/71 |
| 2008/0040587 | A1 * | 2/2008 | Burke | G06F 11/3648 712/227 |
| 2009/0070629 | A1 * | 3/2009 | Arora | G06F 11/263 714/32 |
| 2009/0164861 | A1 * | 6/2009 | Tseng | G06F 11/263 714/739 |
| 2009/0282143 | A1 * | 11/2009 | Mali | G01R 31/31907 709/224 |
| 2009/0307468 | A1 * | 12/2009 | Choudhury | G06F 11/263 712/227 |
| 2011/0046979 | A1 | 2/2011 | Tulipano | |
| 2011/0166879 | A1 | 7/2011 | Lee | |
| 2012/0283574 | A1 | 11/2012 | Park | |
| 2014/0032969 | A1 * | 1/2014 | Landa | G06F 11/263 714/33 |
| 2015/0220411 | A1 * | 8/2015 | Shivanna | G06F 11/2289 714/19 |
| 2015/0316605 | A1 * | 11/2015 | Deutsch | G01R 31/31854 702/117 |

OTHER PUBLICATIONS

Zillner et al., "Image Metadata Reasoning for Improved Clinical Decision Support", Network Modeling Analysis in Health Informatics and Bioinformatics, vol. 1, Issue 1-2 , 2012, pp. 37-46.

Demner-Fushman et al., "Annotation and Retrieval of Clinically Relevant Images", International Journal of Medical Informatics, 2009. (9 pages).

\* cited by examiner

TEST GENERATION USING EXPECTED MODE OF THE TARGET HARDWARE DEVICE

TECHNICAL FIELD

The present disclosure relates to hardware testing in general, and to test generation, in particular.

BACKGROUND

Computerized devices control almost every aspect of our life—from writing documents to controlling traffic lights. However, computerized devices are bug-prone, and thus require a testing phase in which the bugs should be discovered. The testing phase is considered one of the most difficult tasks in designing a computerized device. The cost of not discovering a bug may be enormous, as the consequences of the bug may be disastrous. For example, a bug may cause the injury of a person relying on the designated behavior of the computerized device. Additionally, a bug in hardware or firmware may be expensive to fix, as patching it requires call-back of the computerized device. Hence, many developers of computerized devices invest a substantial portion of the development cycle to discover erroneous behaviors of the computerized device.

During testing phase, developers, QA staff members, and the like test a newly developed computer component to verify that it operates properly. In some cases, test cases (also referred to simply as "tests") may be devised to provide stimuli to the component, and enable testing whether its operation is correct (e.g., as expected).

In the context of testing new hardware design of a processing unit component, the test protocol may typically involve a three stage cycle: (1) generation, in which a specialized component referred to as "test generator" produces a set of machine instructions to be executed directly by the Design Under Test (DUT), in accordance with a desired test case specified by a user, (2) execution, wherein the generated instructions are performed by the DUT, and (3) checking, wherein the execution results are checked for correctness.

BRIEF SUMMARY

One exemplary embodiment of the disclosed subject matter is a method for testing a hardware component capable of switching between at least two modes of operation, comprising: setting an expected mode of the hardware component to a first mode; parsing a test template containing a plurality of template statements of tests to be performed on the hardware component, wherein at least one template statement is a marker statement indicating a request to change a mode of operation of the hardware component; and generating instructions for the hardware components based on one or more parsed template statements, wherein said generating instructions comprises: generating a first set of instructions for the hardware component, wherein the first set of instructions is to be executed by the hardware component when operating in the first mode of operation; in response to a parsed template statement being a marker statement, generating an intermediary set of one or more instructions to cause the hardware component to change the mode of operation to a second mode in accordance with the marker instruction, and modifying the expected mode of the hardware component to the second mode; and generating a second set of instructions for the hardware component, wherein the second set of instructions is to be executed by the hardware component when operating in the second mode of operation; wherein said generating the first set and generating the second set comprise: determining the expected mode of the hardware component and generating instructions in accordance with the expected mode of the hardware component; wherein said generating the first set and generating the second set are performed without having an expected full state of the hardware component.

Another exemplary embodiment of the disclosed subject matter is a computerized apparatus for testing a hardware component capable of switching between at least two modes of operation, wherein said computerized apparatus comprises a processor, wherein said computerized apparatus comprising: a test template parsing component for parsing a test template containing a plurality of template statements of tests to be performed on the hardware component, wherein at least one template statement is a marker statement indicating a request to change a mode of operation of the hardware component; an expected mode determination component for determining an expected mode of the hardware component, wherein said expected mode determination component is configured to determine the expected mode based on the marker statement, wherein the expected mode is determined without having an expected full state of the hardware component; a test generator component for generating a set of instructions to be executed by the hardware component under test based on a template statement parsed by said test template parsing component, said test generator is adapted to generate the instructions in accordance with an expected mode of operation of the hardware component, wherein, responsive to a parsed template statement being a marker statement, said test generator is configured to generate an intermediary set of instructions to cause the hardware component to change the mode of operation and to update the expected mode of the hardware component accordingly; and a checking component for verifying correctness of data resulting from executing a generated set of instructions by the hardware component, wherein said checking component verifies the results in accordance with the expected mode of the hardware component during execution.

Yet another exemplary embodiment of the disclosed subject matter is a computer program product comprising a computer readable storage medium retaining program instructions, which program instructions when read by a processor, cause the processor to perform a method for testing a hardware component capable of switching between at least two modes of operation, comprising: setting an expected mode of the hardware component to a first mode; parsing a test template containing a plurality of template statements of tests to be performed on the hardware component, wherein at least one template statement is a marker statement indicating a request to change a mode of operation of the hardware component; and generating instructions for the hardware components based on one or more parsed template statements, wherein said generating instructions comprises: generating a first set of instructions for the hardware component, wherein the first set of instructions is to be executed by the hardware component when operating in the first mode of operation; in response to a parsed template statement being a marker statement, generating an intermediary set of one or more instructions to cause the hardware component to change the mode of operation to a second mode in accordance with the marker instruction, and modifying the expected mode of the hardware component to the second mode; and generating a second set of instructions for the hardware component, wherein the second set of instructions is to be executed by the hardware component when operating in the second mode of operation; wherein said generating the first set and generating the second set comprise: determining the expected mode of the hardware component and generating instructions in accordance with the expected mode of the hardware component; wherein said generating the first set and generating the second set are performed without having an expected full state of the hardware component.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Modern day processors may support a diversified variety of different hardware operating modes as a function of a processor state, including: different memory access schemes, for example, access to the data in little and big endian modes; different memory address mappings, for example access to data with translation either enabled or disabled; different instruction sets that the processor may be switched between to allow interworking, for example the ARM and Thumb instruction sets; etc.

From a validation perspective it would be desired to have the DUT switch between the different states within a single test case to verify that it functions properly. In order to perform state aware test generation, several components of the environment in which the testing takes place may need to be synchronized with respect to a state of the DUT at the time of execution. For example, the test generator may depend on the state of the DUT to generate correct instructions, or the checking component and debug environment may depend on the state of the DUT to correctly interpret data stored in memory.

With regard to test generation, two different approaches may be recognized, as follows. A first approach, which may be referred to as "state aware" test generation, employs a reference model of the DUT that emulates its entire structure and functionality. The reference model depicts the full state of the DUT, including all values of all registers of the DUT, at any stage of the test and after the execution of a given instruction. During testing, the test generator is running in lockstep with the reference model and informs it on each new generated instruction to ensure that the reference model is kept in an up to date state with the test generator. The test generator can determine the architectural state of the DUT by querying the state of the reference model. In this approach, the test generator may generate more meaningful and interesting tests by taking into account the current state of the DUT as determined from the reference model. This approach may be used in "pre-silicon" verification, which is an early phase in development wherein a design is tested in a virtual environment, usually by simulation in software.

By contrast, in a second approach that may be referred to as "static" test generation, the test generator is oblivious to the state of the DUT, thus it may produce test cases of lower quality, but also may be more light weight and simple in terms of its construction and operation. This approach may also be used in "post-silicon" verification, a later phase in development wherein an already fabricated physical instance of the DUT is then tested in real world environment at actual speed and scale. Employing state aware test generation may not be feasible as it may require substantial resources from the DUT which executes the test and the reference model, and as it may rely on the reference model providing correct results, which may not be the case if the DUT which has not yet been verified executes the reference model.

One technical problem dealt with by the disclosed subject matter is to achieve synchronization among different components of the verification environment with respect to a pseudo-state of a DUT, in such situations where an expected full state is unavailable, as in the case of post-silicon validation. The DUT may be an integrated circuit, a chip, a processor, or the like.

One technical solution is to use special marker statements that are predetermined and known in advance to the test generator, the checking tool and the debugging environment. These markers are used to designate points in a test case where the state of the DUT is modified at run-time in a pre-defined and deterministic way. For example, a marker statement may signify a change of a mode of operation of the DUT, such as: a change in memory access mode, e.g. from Little Endian mode to Big Endian mode, or vice versa; a change in memory translation mode, e.g. by modified mapping; a change in Instruction Set Architecture (ISA), e.g. from ARM/A32 mode to ARM/Thumb mode, or vice versa; and the like. In some exemplary embodiments, the test generation is not "static" nor "state aware" but rather "pseudo state aware" as it may be aware of only a portion of the state or a predetermined limited characteristic of the state of the DUT and not all values of all registers.

One technical effect of utilizing the disclosed subject matter is to increase quality of the generated test cases in comparison to static generation.

Another technical effect of the disclosed subject matter is that the test generation framework remains simple and light weight, thus being adequate for post-silicon validation tools.

Figure 1:
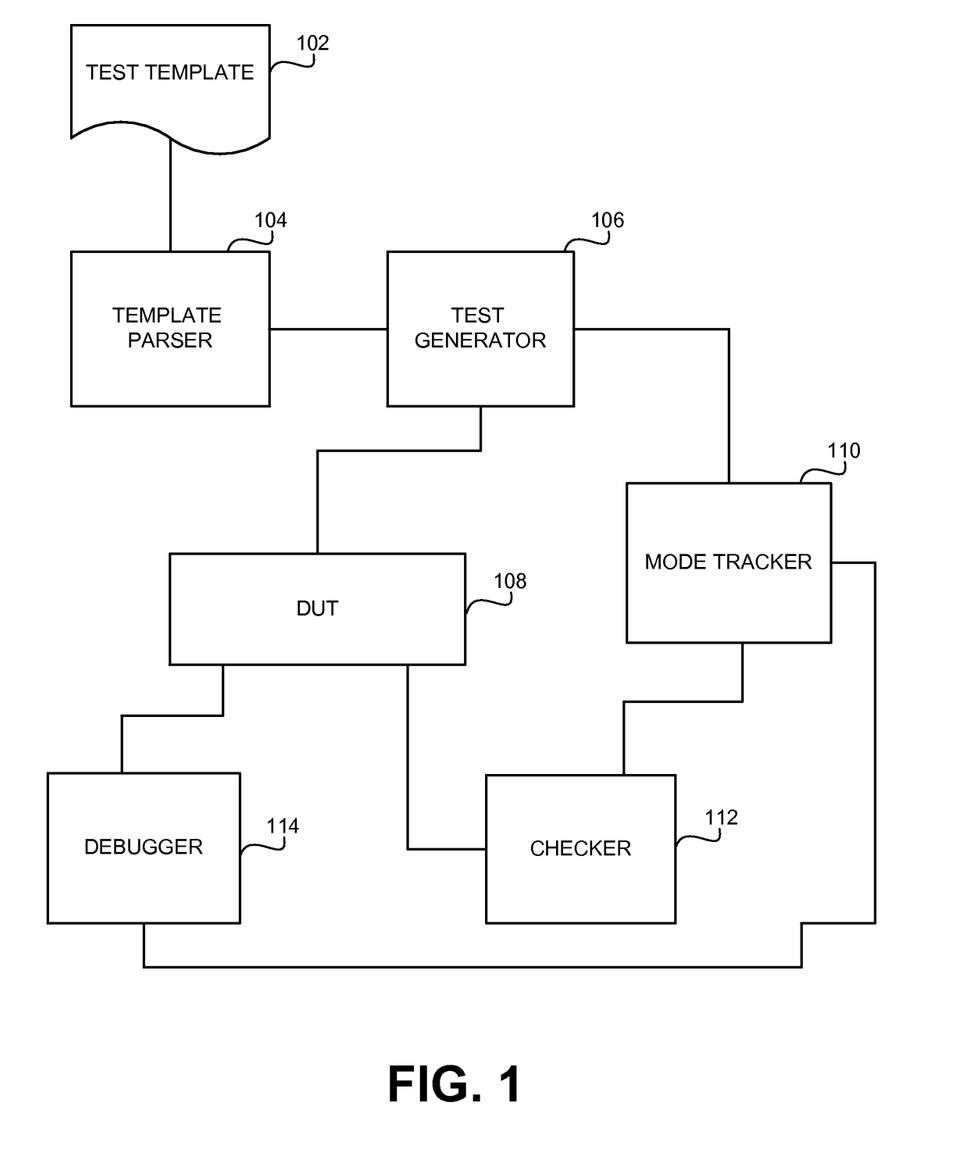
FIG. 1 shows a block diagram of an apparatus, in accordance with some exemplary embodiments of the disclosed subject matter.

Referring now to FIG. 1 showing a block diagram of an apparatus in accordance with some exemplary embodiments of the disclosed subject matter.

In some exemplary embodiments, a test template 102 in which a user may specify test cases for testing a DUT 108 may be provided. Test template 102 may include template statements which may define a set of one or more concrete instructions that adhere to the template, such as having concrete values of operands, concrete instruction type (e.g., the template statement may be an access instruction and the concrete instruction type may be a specific instruction which accesses memory), or the like. A parser 104 may parse template statements in the test template 102 and pass the parsed statements to a test generator 106. The test generator 106 may determine an expected mode of the DUT 108, and generate a set of instructions for execution by the DUT 108 in accordance with the parsed template statement and the expected mode of DUT 108. In some exemplary embodiments, test generator 106 may query mode tracker 110, also referred to as an expected mode determination component, in order to determine the expected mode of the DUT 108.

Test template 102 may contain marker statements to mark a change of mode of DUT 108. Upon receiving a parsed marker statement from parser 104, test generator 106 may generate a dedicated set of instructions to cause DUT 108 to change mode in accordance with the marker statement. In some exemplary embodiments, test generator 106 may update mode tracker 110 of the expected mode of DUT 108 as of after the change in accordance with the marker statement is to be effected.

The generated test may be executed by DUT 108. Following execution by the DUT 108 of the instructions generated by test generator 106, a checker 112 may check execution results for correctness. In some cases, checker 112 may compare actual results with expected results, may compare results of two or more executions of the test, or validate the correctness of the execution in any other manner. The checker 112 may query mode tracker 110 for an expected mode of the DUT 108 during execution, in order to interpret the results appropriately.

In some exemplary embodiments, a debugger 114 may be used for exploring and fixing errors discovered by checker 112. The debugger 114 may query mode tracker 110 for an expected mode of the DUT 108 during execution, in order to interpret the debugging data appropriately.

In some exemplary embodiments, test generator 106, template parser 104, debugger 114, checker 112, or any combination thereof, may be implemented as software that is being executed by the DUT 108.

Figure 2:
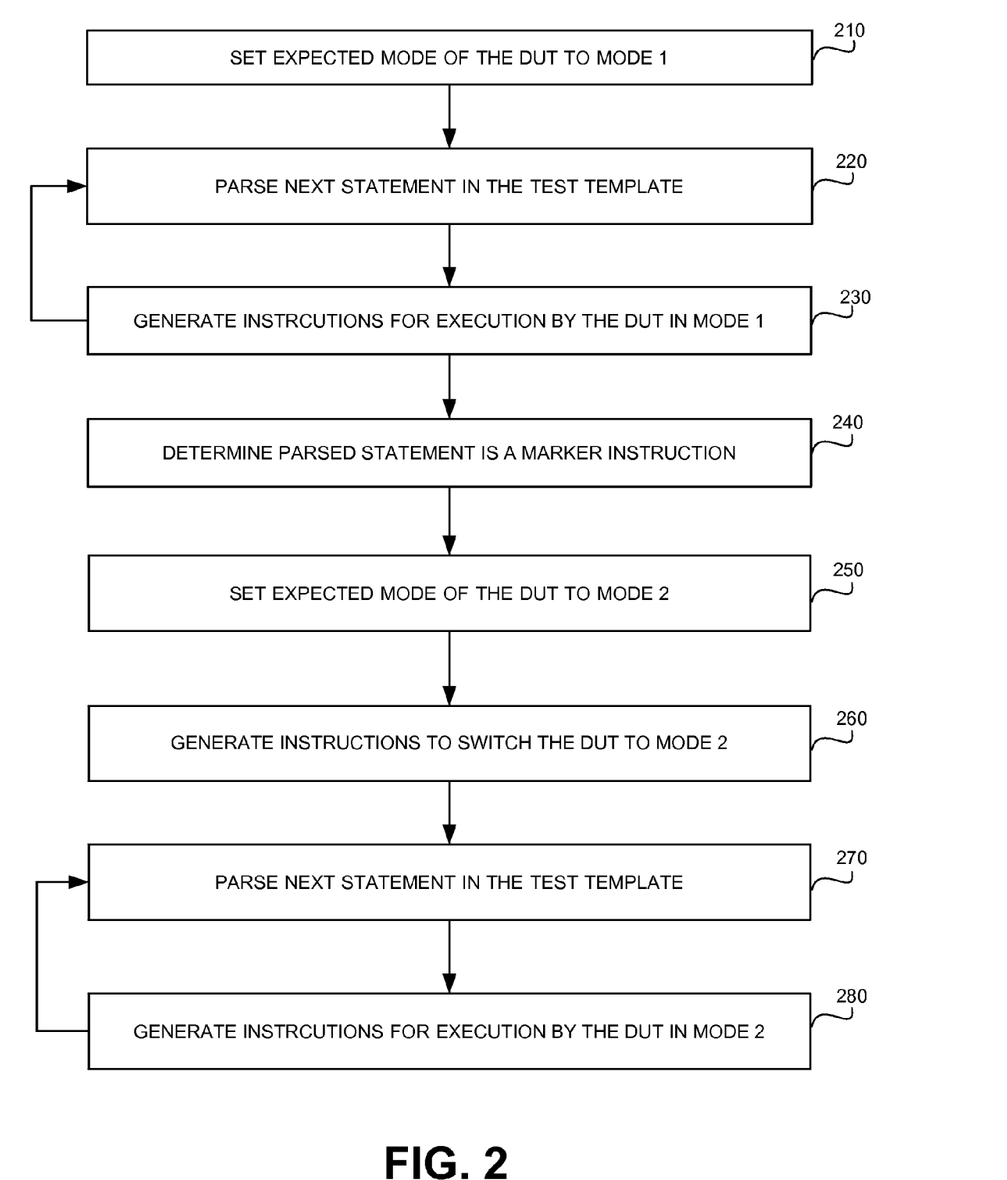
FIG. 2 shows a flowchart diagram of a method, in accordance with some exemplary embodiments of the disclosed subject matter.

Referring now to FIG. 2 showing a flowchart diagram of a method in accordance with some exemplary embodiments of the disclosed subject matter.

On Step 210, an expected mode of the DUT may be set to a first mode. In some exemplary embodiments, the first mode may be an initial mode of the DUT. In some exemplary embodiments, the expected mode may be set in a mode tracker, such as 110 of FIG. 1, which may be used to track the expected mode of the DUT.

On Step 220, a test template containing template statements of test cases that the DUT may be required to undergo is parsed. The test template may be parsed by a template parser, such as 104 of FIG. 1.

On Step 230, a first set of instructions to be executed by the DUT while operating in the first mode is generated based on one or more parsed test statements. The set of instructions may be generated by a test generator, such as 106 of FIG. 1.

On Step 240, one parsed statement is determined to be a marker statement. In response to such determination, on Step 250 the expected mode of the DUT is modified to a second mode. In some exemplary embodiments, the expected mode is updated in a mode tracker, such as 110 of FIG. 1.

On Step 260, an intermediary set of instructions dedicated to switch the DUT to the second mode is generated. The intermediary set of instructions may include one or more instructions. In some cases, the intermediary set of instructions correlates to the marker statement.

On Step 270, one or more template statements subsequent to the marker statement in the test template may be parsed, similarly as in Step 220.

On Step 280, a second set of instructions to be executed by the DUT while operating in the second mode is generated based on the one or more subsequent parsed template statements.

In some exemplary embodiments, there may be more than a single marker statement and the expected mode of the DUT may be modified several times during execution, such as to more than two different modes or to two different modes in a rotating manner, or the like.

In some exemplary embodiments, the generation of instructions to be executed by the DUT, such as on Step 230 and on Step 280 may be performed by a test generator, such as 106 of FIG. 1. The test generator may generate an instruction based on the expected mode as provided by a mode tracker (e.g., 110 of FIG. 1). As an example, the test generator may query the mode tracker to retrieve an expected mode of operation which defines a valid instruction set. The test generator may subsequently generate instructions using the valid instruction set which is defined by the mode of operation of the DUT. As another example, the expected mode may indicate which memory mapping is being used, and the generator may generate an instruction suitable to the expected memory mapping that is being used. It will be noted that the instruction may be optimized to induce corner cases of the DUT based on the mode, such that the instruction may be valid for any memory mapping used, but provide a potentially more error prone stimuli to the DUT when a specific memory mapping is being used.

The teachings of the present disclosure may be further illustrated by considering the following two non-limiting examples. In a first example, a user may want to run a first part of a test in Big Endian mode, and perform a mode switch during run-time such that a second part of the test is run in Little Endian mode. In a second example, the user may want to run a test in which a first part runs in ARM/A32 mode, and, following a switch, the second part of the test runs in ARM/Thumb mode.

In accordance with the disclosed subject matter, mode switching during run-time of a test case is synchronized between different components of the verification environment. Thus, in one example, the test generator may place the instructions of the first part and the second part of the test in a different manner in memory for the DUT to fetch them correctly, as the order of the bytes with respect to the memory addresses is expected to be reversed between the two parts. At run time, the switch may be triggered by an appropriate instruction or set of instructions for execution by the DUT, such as a change to the value of an LE bit in the CPU Machine State Register. Lastly, the checking component and debugging tool may access the execution results in memory of the first and second part of the test in a different manner for correct interpretation, similarly as in the test generation phase.

In another example, the instructions for the first and second parts of the test may be chosen by the test generator from an appropriate Instruction Set Architecture (ISA). At run time, the switch may be triggered by an appropriate instruction or set of instructions for execution by the DUT. The execution results for the first and second part of the test may be parsed by the checking component and debugging tool based on different assemblers in accordance with the run-time mode.

In accordance with the disclosed subject matter, mode synchronization may be achieved using pre-defined specific marker statements that are recognized by the different components of the verification environment as triggers for the switch. Each of the components is configured to react to a given marker statement in a desired manner and take necessary actions to maintain functional coherence.

In some exemplary embodiments, the marker statement may be a dedicated instruction included in an instruction set of the DUT to trigger a mode switch. For example, in some processor architectures such as the Power architecture, a change of the Endianess mode is effected by setting a bit in the Machine State Register (MSR). The MSR, in turn, can be modified through the move-to-MSR (mtmsr) instruction. The marker statement may be implemented through use of the mtmsr instruction with a predetermined register, thus serving as a coordinated trigger.

Accordingly, a user may specify the marker in a test template to indicate the desired switch. The test generator, in response to the marker, may construct an instruction to reload the desired value into the reserved register, for example by introducing reloading instructions into the test-case, and generate the mtmsr instruction properly to create the switch. The checking and debugging mechanisms may be configured to recognize the marker, when parsing the instruction stream, as a trigger to change the way the rest of the instruction stream is parsed.

It should be noted that by use of a dedicated instruction, as in the case described above, no special handling during run-time may be required, as the mode switch is conducted in a way inherent to the architecture of the DUT.

In some further exemplary embodiments, a required change may call for a sequence of instructions, in which case there may not be a single point where a change of mode from one value to the other can be indicated. A single marker statement may be defined.

In some exemplary embodiments, a system call instruction with a predefined number can be used as the marker statement to trigger the change. In some exemplary embodiments, the system call may not be a priori configured to cause a change in a mode of operation of the DUT. For example, a template statement indicating the system call may be interpreted by the generator as an instruction to generate one or more instructions that are configured to change the mode of operation but do not include the system call itself. Additionally or alternatively, the system call may be utilized as part of a mechanism that changes the mode of operation of the DUT. For example, modification of translation mapping of virtual memory addresses to physical memory addresses may be done by setting a system call to invoke during run-time a function that actually performs the switch. Such switching function would invalidate translation mappings already set in the hardware and create new ones based on the next map.

Accordingly, a user may specify the marker in a test template to indicate the desired switch. The test generator may be configured to identify the marker as an indicator to switch the mapping of addresses for the next part of the generation of the test. At run-time the switching function would be invoked by the system call as described above. The checking and debugging mechanisms may be configured to recognize the marker, when parsing the instruction stream, as a trigger to change the way virtual addresses are mapped to physical addresses.

In yet some further exemplary embodiments, a flexible mechanism enabling a user to control further details of the switch may be utilized. In some exemplary embodiments, a part of the marker statement may be used as an index to a table in which one of the components may specify further details related to the switch. For example, in case of a change in translation mapping as discussed above, a user may be further provided with an ability to specify which translation paths are to be replaced by which translation paths. This may be implemented by using an illegal instruction as the marker statement to trigger the mode change.

Accordingly, a user may specify the marker in a test template to indicate a desired replacement of path A with path B. The test generator may be configured to create an illegal instruction where certain bits in the encoded instruction point to an entry in a pre-allocated table. Within the table, at the location corresponding to the index as discussed above, the test generator may mark path A as the path to be replaced and path B as the new path. At run-time, when the marker statement is executed, an illegal instruction exception may be triggered. An exception handler may be configured to parse the illegal instruction, extract the index, and invoke the switching function with path A and path B as its operands. The checking and debugging mechanisms may be configured to change the mapping with which the test is interpreted.

In some exemplary embodiments, components such as the generator, checking component, debugging tool, or the like, may be configured to query an expected mode determination component, which tracks an expected mode based on abstract instructions of the test template. Additionally or alternatively, the expected mode determination component may be configured to parse stream of concrete instructions which are being executed by the DUT to determine the expected mode by identifying predetermined concrete instructions that are associated with a change in a mode of operation.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for testing a hardware component capable of switching between at least two modes of operation, comprising:
   setting an expected mode of the hardware component to a first mode;
   parsing a test template containing a plurality of template statements of tests to be performed on the hardware component, wherein at least one template statement is a marker statement indicating a request to change a mode of operation of the hardware component; and
   generating instructions for the hardware components based on one or more parsed template statements, wherein said generating instructions comprises:
      generating a first set of instructions for the hardware component, wherein the first set of instructions is to be executed by the hardware component when operating in the first mode of operation;
      in response to a parsed template statement being a marker statement, generating an intermediary set of one or more instructions to cause the hardware component to change the mode of operation to a second mode in accordance with the marker instruction, and modifying the expected mode of the hardware component to the second mode; and generating a second set of instructions for the hardware component, wherein the second set of instructions is to be executed by the hardware component when operating in the second mode of operation;

wherein said generating the first set and generating the second set comprise: determining the expected mode of the hardware component and generating instructions in accordance with the expected mode of the hardware component;

wherein said generating the first set and generating the second set are performed without having an expected full state of the hardware component.

2. The method of claim 1, wherein the marker statement is a dedicated instruction of the hardware component to change its mode of operation.

3. The method of claim 1, wherein the marker statement is a system call, wherein the system call is not configured to change the mode of operation of the hardware component.

4. The method of claim 1, wherein the marker statement is an illegal instruction.

5. The method of claim 1, wherein the at least two modes of operation of the hardware component are different orderings of data storage in memory.

6. The method of claim 1, wherein the at least two modes of operation of the hardware component are different mappings of memory addresses.

7. The method of claim 1, wherein the at least two modes of operation of the hardware component are different instruction sets supported by the hardware component.

8. The method of claim 1, further comprising processing the generated first and second set of instructions by a debugging tool, wherein each set is processed in accordance with the respective expected mode of the hardware component as determined based on the marker statement.

9. A computerized apparatus for testing a hardware component capable of switching between at least two modes of operation, wherein said computerized apparatus comprises a processor, wherein said computerized apparatus comprising:

a test template parsing component for parsing a test template containing a plurality of template statements of tests to be performed on the hardware component, wherein at least one template statement is a marker statement indicating a request to change a mode of operation of the hardware component;

an expected mode determination component for determining an expected mode of the hardware component, wherein said expected mode determination component is configured to determine the expected mode based on the marker statement, wherein the expected mode is determined without having an expected full state of the hardware component;

a test generator component for generating a set of instructions to be executed by the hardware component under test based on a template statement parsed by said test template parsing component, said test generator is adapted to generate the instructions in accordance with an expected mode of operation of the hardware component, wherein, responsive to a parsed template statement being a marker statement, said test generator is configured to generate an intermediary set of instructions to cause the hardware component to change the mode of operation and to update the expected mode of the hardware component accordingly; and a checking component for verifying correctness of data resulting from executing a generated set of instructions by the hardware component, wherein said checking component verifies the results in accordance with the expected mode of the hardware component during execution.

10. The computerized apparatus of claim 9, wherein the marker statement is a dedicated instruction of the hardware component to change its mode of operation.

11. The computerized apparatus of claim 9, wherein the marker statement is a system call.

12. The computerized apparatus of claim 9, wherein the marker statement is an illegal instruction.

13. The computerized apparatus of claim 9, wherein the at least two modes of operation of the hardware component are different orderings of data storage in memory.

14. The computerized apparatus of claim 9, wherein the at least two modes of operation of the hardware component are different mappings of memory addresses.

15. The computerized apparatus of claim 9, wherein the at least two modes of operation of the hardware component are different instruction sets supported by the hardware component.

16. The computerized apparatus of claim 9, further comprising a debugging tool configured to process the generated first and second set of instructions, wherein each set is processed in accordance with the respective expected mode of the hardware component, wherein said debugging tool is operatively coupled to said expected mode determination component.

17. The computerized apparatus of claim 9, wherein said expected mode determination component is configured to operate without making use of a reference model of the hardware component.

18. The computerized apparatus of claim 9, wherein said expected mode determination component is configured to determine an expected mode of operation of the hardware component without having an expected value of a register of the hardware component.

19. The computerized apparatus of claim 9, wherein said expected mode determination component is configured to determine the expected mode based on the marker statement by parsing a stream of instructions which are being executed by the hardware component and identifying the intermediary set of instructions within the stream of instructions.

20. A computer program product comprising a non-transitory computer readable storage medium retaining program instructions, which program instructions when read by a processor, cause the processor to perform a method for testing a hardware component capable of switching between at least two modes of operation, wherein the method comprising:

setting an expected mode of the hardware component to a first mode;

parsing a test template containing a plurality of template statements of tests to be performed on the hardware component, wherein at least one template statement is a marker statement indicating a request to change a mode of operation of the hardware component; and generating instructions for the hardware components based on one or more parsed template statements, wherein said generating instructions comprises:

generating a first set of instructions for the hardware component, wherein the first set of instructions is to be executed by the hardware component when operating in the first mode of operation;

in response to a parsed template statement being a marker statement, generating an intermediary set of one or more instructions to cause the hardware component to change the mode of operation to a second mode in accordance with the marker instruction, and modifying the expected mode of the hardware component to the second mode; and generating a second set of instructions for the hardware component, wherein the second set of instructions is to be executed by the hardware component when operating in the second mode of operation;

wherein said generating the first set and generating the second set comprise: determining the expected mode of the hardware component and generating instructions in accordance with the expected mode of the hardware component;

wherein said generating the first set and generating the second set are performed without having an expected full state of the hardware component.

* * * * *